(12) United States Patent
Linzer et al.

(10) Patent No.: US 8,817,129 B1
(45) Date of Patent: Aug. 26, 2014

(54) CAMERA USING COMBINED COLOR PROCESSING IN LOOKUP

(71) Applicant: Ambarella, Inc., Santa Clara, CA (US)

(72) Inventors: Elliot N. Linzer, Bergenfield, NJ (US); Leslie D. Kohn, Saratoga, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 14/013,433

(22) Filed: Aug. 29, 2013

Related U.S. Application Data

(63) Continuation of application No. 12/706,816, filed on Feb. 17, 2010, now Pat. No. 8,547,445.

(51) Int. Cl.
*H04N 5/228* (2006.01)
*H04N 9/73* (2006.01)

(52) U.S. Cl.
CPC ................................. *H04N 9/73* (2013.01)
USPC ....................................... 348/222.1; 348/254

(58) Field of Classification Search
USPC .............................................. 348/222.1, 254
See application file for complete search history.

(56) References Cited

U.S. PATENT DOCUMENTS

| | | | |
|---|---|---|---|
| 4,275,413 A | 6/1981 | Sakamoto et al. | 358/80 |
| 7,536,487 B1 | 5/2009 | Kohn | 345/503 |
| 7,982,744 B2 | 7/2011 | Moriya et al. | 345/581 |
| 2002/0048084 A1 | 4/2002 | Matsuda | 359/505 |
| 2002/0191085 A1 | 12/2002 | Jaspers | 348/223.1 |
| 2004/0105261 A1 | 6/2004 | Duchame et al. | 362/231 |
| 2004/0141162 A1 | 7/2004 | Olbrich | 353/119 |
| 2004/0156618 A1 | 8/2004 | Hoshi | 386/68 |
| 2005/0190198 A1 | 9/2005 | Koyama | 345/593 |
| 2006/0087696 A1 | 4/2006 | Lee | 358/3.13 |

OTHER PUBLICATIONS

"MT9T001 3-Megapixel Digital Image Sensor—1/2-Inch 3-Megapixel CMOS Active-Pixel Digital Image Sensor", 2003 Micron Technology Inc., pp. 1-37.
"Digital Negative (DNG) Specification", Version 1.3.0.0, Adobe Systems Incorporated, Jun. 2009, pp. 1-89.

*Primary Examiner* — Anthony J Daniels
(74) *Attorney, Agent, or Firm* — Christopher P. Maiorana, PC (57) ABSTRACT

An apparatus having a circuit is disclosed. The circuit may be configured to (i) process a digital image received from a camera sensor and (ii) convert the digital image after the processing. The converting generally uses a lookup table-based conversion that performs both (a) a color correction and (b) a tone correction.

19 Claims, 9 Drawing Sheets

CAMERA USING COMBINED COLOR PROCESSING IN LOOKUP

This application relates to U.S. Ser. No. 12/706,816, filed Feb. 17, 2010, which is incorporated by reference in its entirety.

FIELD OF THE INVENTION

The present invention relates to a method and/or architecture for digital color correction generally and, more particularly, to a camera using combined color processing in lookup.

BACKGROUND OF THE INVENTION

Figure 1:
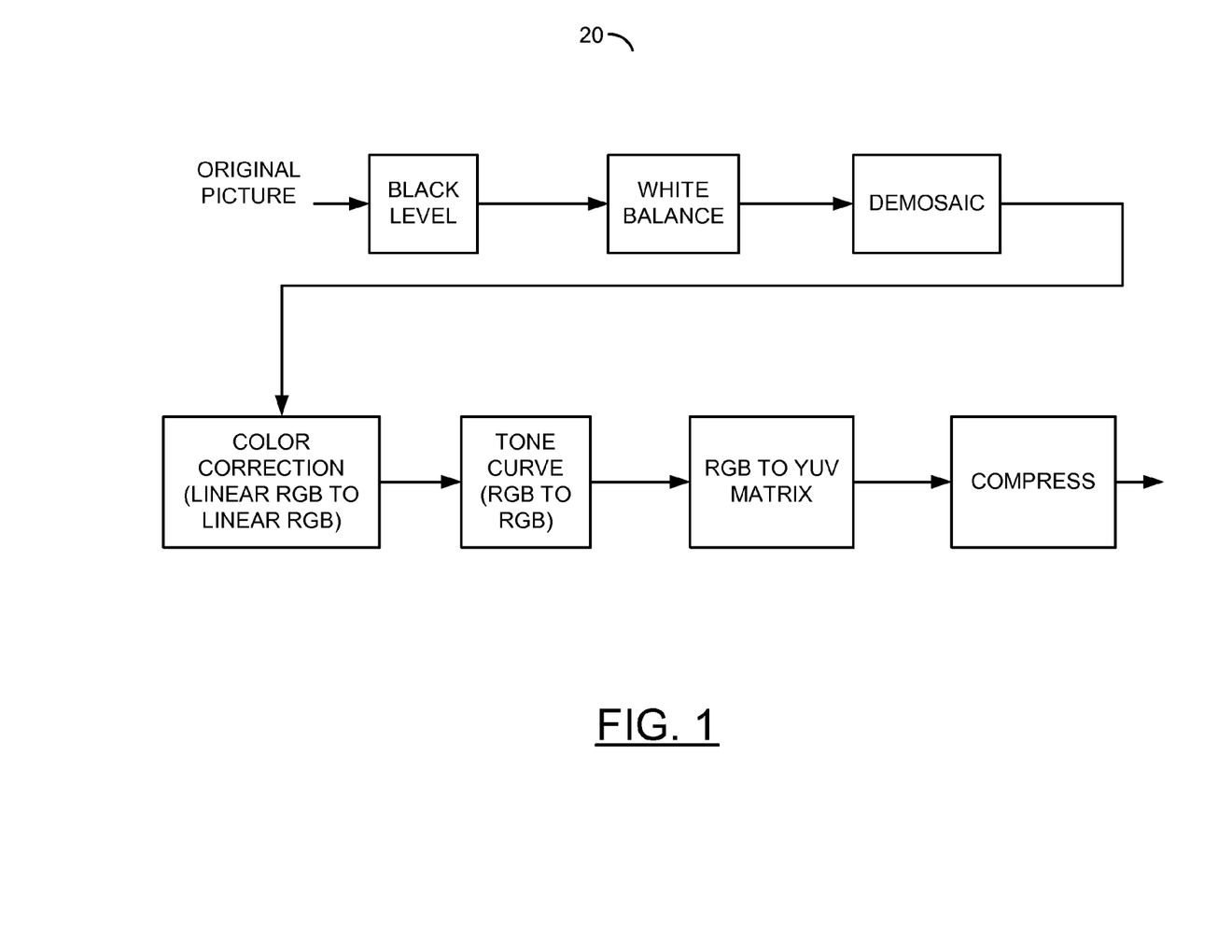
FIG. 1 is a block diagram of a conventional camera color processing pipeline.

Referring to FIG. 1, a block diagram of a conventional camera color processing pipeline 20 is shown. Color correction is commonly used in digital cameras because a spectral response of the camera photo-receptors does not match a desired response in an output color space. The color correction is used to produce a picture that has accurate and aesthetically pleasing colors.

Several conventional color correction methods are currently available. Some methods use a matrix (M) multiplication to calculate an RGB output vector from a red, green, blue (RGB) input vector, such as:

$$R\_out = M11 \times R\_in + M12 \times G\_in + M13 \times B\_in$$

$$G\_out = M21 \times R\_in + M22 \times G\_in + M23 \times B\_in$$

$$B\_out = M31 \times R\_in + M32 \times G\_in + M33 \times B\_in$$

For example, the Adobe "Digital Negative (DNG) Specifications" file format specifies color correction by means of a matrix. Other conventional color correction methods use a three-dimensional lookup table, with interpolation between the table entries. For example, U.S. Pat. No. 4,275,413 describes a method for tetrahedral interpolation.

Matrix conversions are an inexpensive way to perform color correction. Conventional three-dimensional table interpolations are commonly more complex—consuming longer run times on a computer, using more costly hardware or using higher power hardware. The table-based interpolations are more flexible than matrix conversions and can provide quality, realistic or pleasing output colors.

SUMMARY OF THE INVENTION

The present invention concerns an apparatus having a circuit. The circuit may be configured to (i) process a digital image received from a camera sensor and (ii) convert the digital image after the processing. The converting generally uses a lookup table-based conversion that performs both (a) a color correction and (b) a tone correction.

The objects, features and advantages of the present invention include providing a camera using combined color processing in a lookup that may (i) perform a lookup table-based color correction, (ii) perform a lookup table-based tone correction, (iii) perform a lookup table-based color space conversion, (iv) reduce cost compared with conventional techniques, (v) reduce circuitry size compared with conventional techniques and/or (vi) reduce power consumption compared with conventional techniques.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
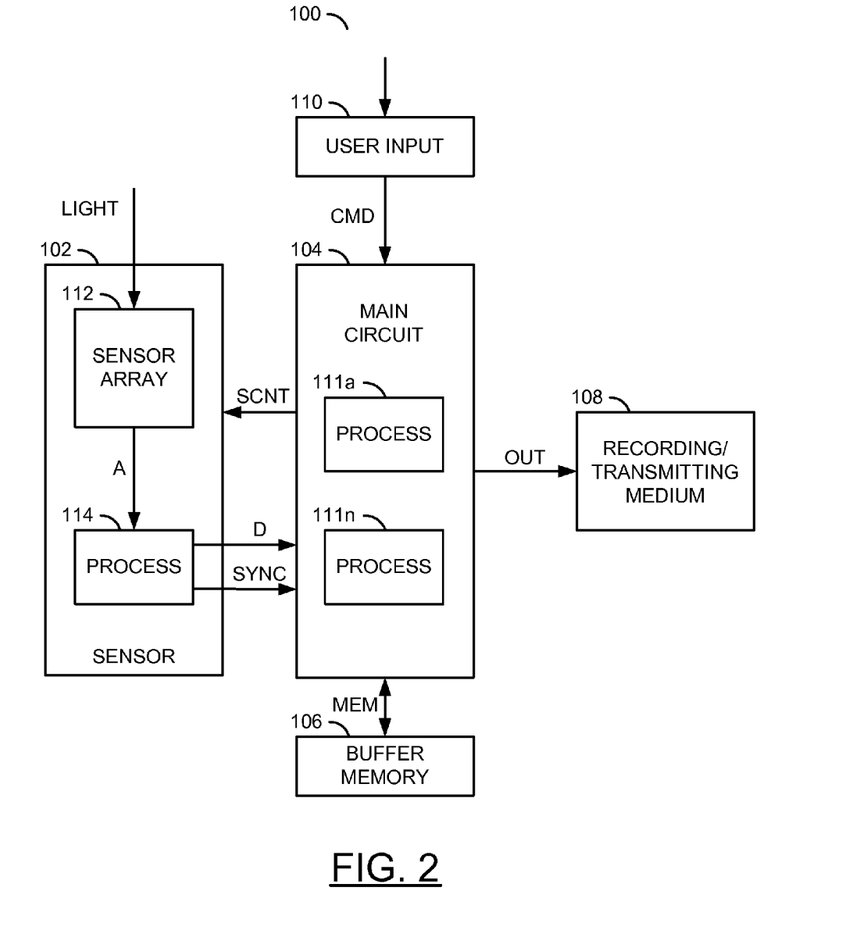
FIG. 2 is a block diagram of an example implementation of an apparatus in accordance with a preferred embodiment of the present invention.

Referring to FIG. 2, a block diagram of an example implementation of an apparatus 100 is shown in accordance with a preferred embodiment of the present invention. The apparatus (or system) 100 may form a digital still camera and/or camcorder. The apparatus 100 generally comprises a circuit (or module) 102, a circuit (or module) 104, a circuit (or module) 106, a circuit (or module) 108 and a circuit (or module) 110. An optical signal (e.g., LIGHT) may be received by the circuit 102. The circuit 102 may generate and present a digital signal (e.g., D) to the circuit 104. A synchronization signal (e.g., SYNC) may also be generated by the circuit 102 and received by the circuit 104. A sensor control signal (e.g., SCNT) may be generated and presented from the circuit 104 to the circuit 102. The circuit 104 may also generate and present an output signal (e.g., OUT) to the circuit 108. A command signal (e.g., CMD) may be generated by the circuit 110 and presented to the circuit 104. A signal (e.g., MEM) may be exchanged between the circuit 104 and the circuit 106. The circuits 102 to 110 may be implemented in hardware, software, firmware or any combination thereof.

The circuit 102 may implement an electro-optical sensor circuit. The circuit 102 is generally operational to convert the optical image received in the signal LIGHT into the signal D based on parameters received in the signal SCNT. The signal D may convey the one or more optical images as one or more digital images (e.g., fields, frames, pictures). The signal SYNC generally conveys synchronization information related to the images and the pixels within. The signal SCNT may carry windowing, binning, read rate, offset, scaling, color correction and other configuration information for use by the circuit 102. The images may be generated having an initial resolution and an initial color space (e.g., a Bayer color space) at an initial data rate. In some embodiments, the circuit 102 may include an image pipeline or other image source that supplies source images in the signal D.

The circuit 104 may be referred to as a main circuit. The circuit 104 is generally operational to generate the signal OUT by processing the images received in the signal D. The circuit 104 may be operational to generate the signal SCNT based on the user selections received through the signal CMD. The circuit 104 may load and store data to the circuit 106 through the signal MEM. The signal OUT generally comprises a still image (e.g., JPEG) and/or a video bitstream (e.g., ITU-R BT.601, ITU-R BT.709, ITU-R BT.656-4, H.264/AVC, MPEG-2, MPEG-4) having a sequence of images (or pictures). Other standard and/or proprietary compression standards may be implemented to meet the criteria of a particular application.

The circuit 104 generally comprises two or more circuits (or modules) 111a-111n. Each of the circuits 111a-111n may be configured to perform one or more operations on the images to achieve final images in the signal OUT. Processing of the images may include, but is not limited to, decimation filtering, interpolation, formatting, color space conversion, color corrections, tone corrections, gain corrections, offset corrections, black level calibrations, white balancing, image sharpening, image smoothing and the like. In some embodiments, the processing may be implemented in whole or in part by software running in the circuits 111a-111n. In some embodiments, the circuit 102 and the circuit 104 may be fabricated in (on) separate dies. In other embodiments, the circuit 102 and the circuit 104 may be fabricated in (on) the same die. Additional details of the circuit 104 may be found in U.S. Pat. No. 7,536,487, hereby incorporated by reference in its entirety.

The circuit 106 may implement a buffer memory. The circuit 106 is generally operational to temporarily store image data (e.g., luminance and chrominance) for the circuit 104. In some embodiments, the circuit 106 may be fabricated as one or more dies separate from the circuit 104 fabrication. In other embodiments, the circuit 106 may be fabricated in (on) the same die as the circuit 104. The circuit 106 may implement a double data rate (DDR) synchronous dynamic random access memory (SDRAM). Other memory technologies may be implemented to meet the criteria of a particular application.

The circuit 108 may implement a medium. The medium 108 generally comprises one or more nonvolatile memory devices and/or one or more transmission media capable of storing/transmitting the signal OUT. In some embodiments, the recording medium 108 may comprise a single memory medium. For example, the recording medium 108 may be implemented as a FLASH memory or a micro hard disk drive (also known as a "1-inch" hard drive). The memory may be sized (e.g., 4 gigabyte FLASH, 12 gigabyte hard disk drive) to store up to an hour or more of high-definition digital video. In some embodiments, the recording medium 108 may be implemented as multiple media. For example, (i) a FLASH memory may be implemented for storing still pictures and (ii) a tape medium or an optical medium may be implemented for recording the signal OUT. The transmitting medium 108 may be implemented as a wired, wireless and/or optical medium. For example, the wired transmission medium 108 may be implemented as an Ethernet network. A wireless transmission medium 108 may be implemented as a wireless Ethernet network and/or a wi-fi network. An optical transmission medium 108 may be implemented as an optical Serial Digital Interface video channel. Other types of media may be implemented to meet the criteria of a particular application.

The circuit 110 may implement a user input circuit. The circuit 110 may be operational to generate the signal CMD based on commands received from a user. The commands received may include, but are not limited to, a take still picture command, a start recording command, a stop recording command, a zoom in command and a zoom out command. In some embodiments, the signal CMD may comprise multiple discrete signals (e.g., one signal for each switch implemented in the user input circuit 110). In other embodiments, the signal CMD may carry the user entered commands in a multiplexed fashion as one or a few signals.

The circuit 102 generally comprises a sensor array 112 and a circuit (or module) 114. The array 112 may be operational to convert the optical images into a series of values in an analog signal (e.g., A). The values conveyed in the signal A may be analog voltages representing an intensity value at a predetermined color for each individual sensor element of the circuit 112. The circuit 112 may include an electronic cropping (or windowing) capability. The electronic cropping capability may be operational to limit readout of image elements in a window (or an active area) of the circuit 112. The circuit 114 may be operational to process and then convert the analog signal A to generate the digital signal D. The circuits 112 and 114 may be implemented in hardware, software, firmware or any combination thereof.

Processing of the electronic images in the circuit 114 may include, but is not limited to, analog gain for color corrections and analog offset adjustments for black level calibrations. The conversion generally comprises an analog to digital conversion (e.g., 10-bit). An example implementation of the circuit 102 may be an MT9T001 3-megapixel digital image sensor available from Micron Technology, Inc., Bosie, Id. Larger or smaller circuits 102 may be implemented to meet the criteria of a particular application.

Figure 3:
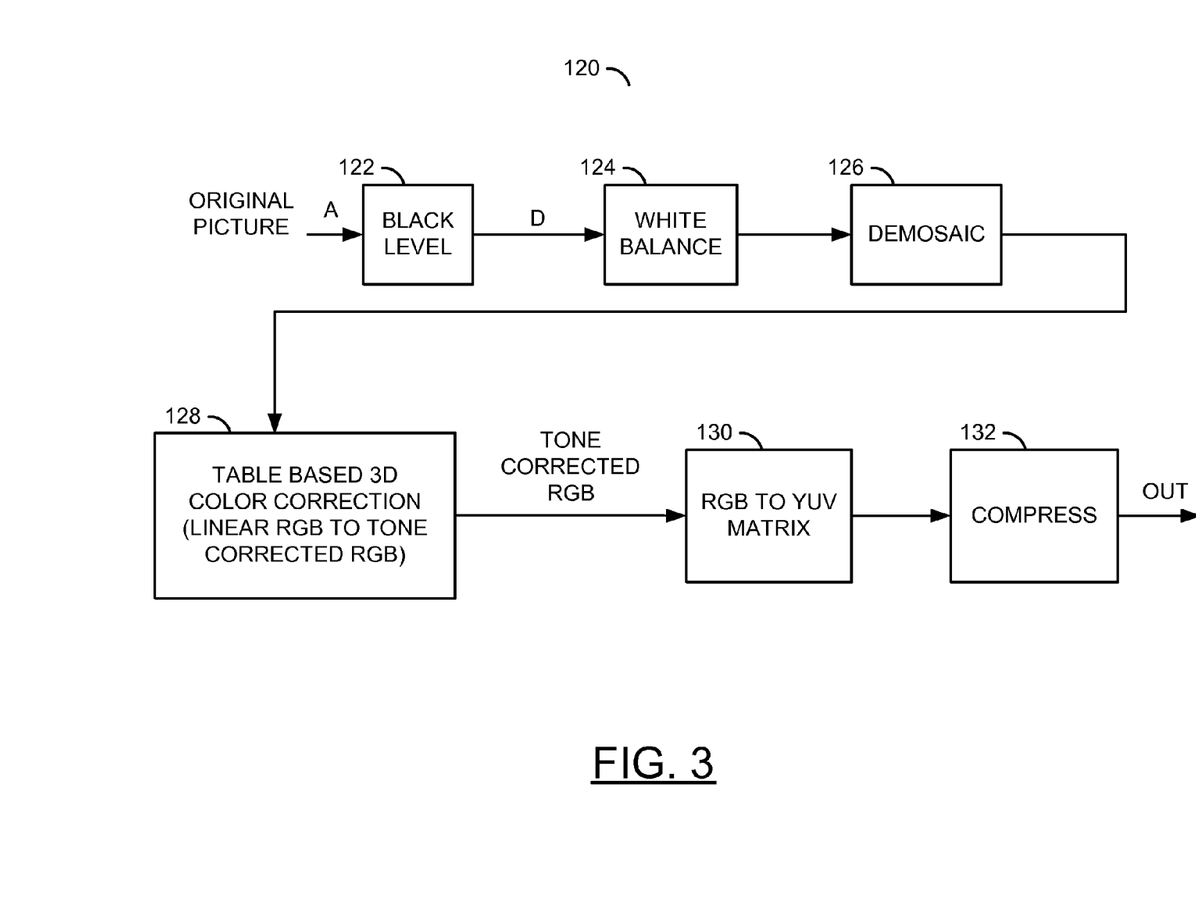
FIG. 3 is a functional block diagram of a first image processing method.

Referring to FIG. 3, a functional block diagram of a first image processing method 120 is shown. The method (or process) 120 may be implemented by the circuits 102, 104 and 106. The method 120 generally comprises a step (or block) 122, a step (or block) 124, a step (or block) 126, a step (or block) 128, a step (or block) 130 and a step (or block) 132.

In the step 122, the circuit 102 may perform a black level correction on the original picture or pictures received via the signal A. Once digitized, each digital image may undergo a white balancing in the step 124 within the circuit 104. A demosaicing of the images is generally performed by the circuit 104 (e.g., circuit 111a) in the step 126.

In the step 128, the circuit 104 (e.g., circuit 111b) may perform a lookup table-based conversion of the images. The conversion generally maps the images from a linear RGB color space to a tone corrected RGB color space. The conversion may mix the components of the linear color space (e.g., at least one of the output RGB components varies based on at least two of the input RGB components) as well as convert from a linear space to a nonlinear space. The circuit 104 may convert the tone corrected images from the RGB color space to a YUV color space by a matrix multiplication in the step 130. The YUV color space images are generally compressed by the circuit 104 to generate the signal OUT in the step 132. An advantage of the method 120 compared with that of the method 20 is the reduction in the number of steps performed. Therefore, the method 120 may be implemented with less circuitry, occupy less die area and/or consume lower power compared with normal color processing techniques.

Figure 4:
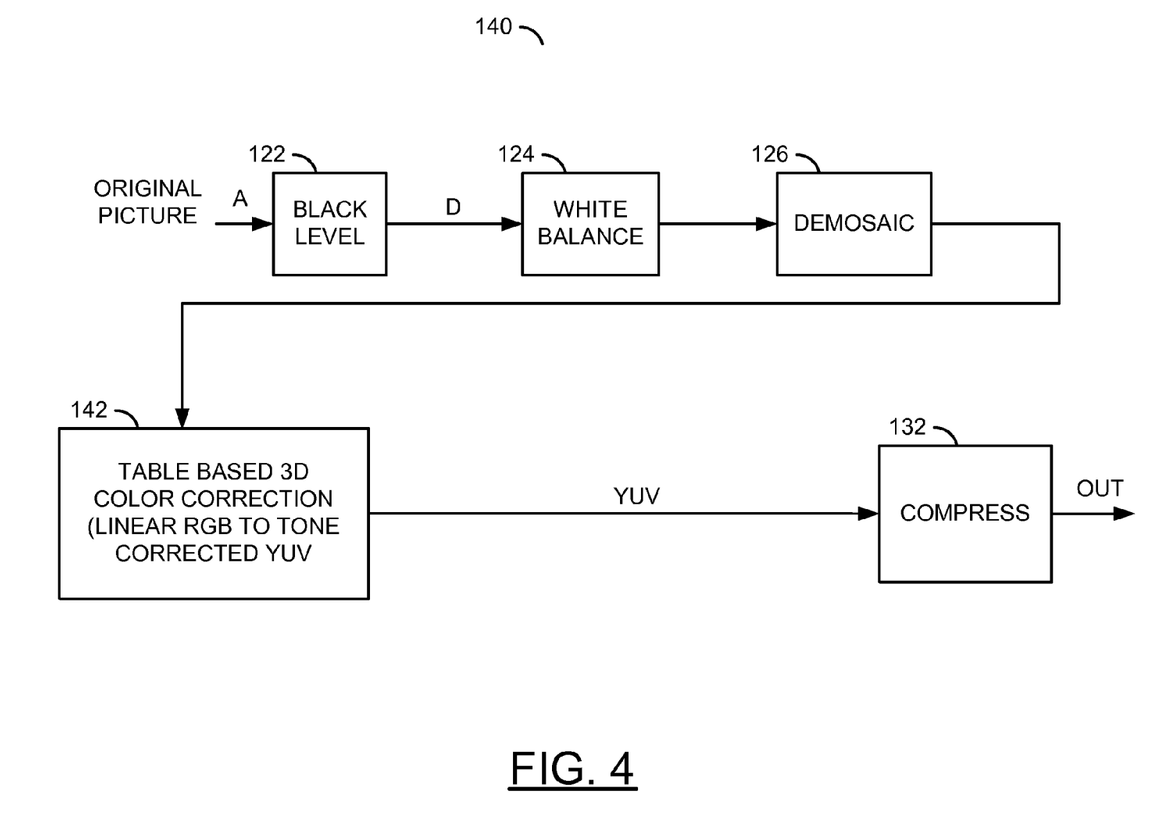
FIG. 4 is a functional block diagram of a second image processing method.

Referring to FIG. 4, a functional block diagram of a second image processing method 140 is shown. The method (or process) 140 may be implemented by the circuits 102, 104 and 106. The method 140 generally comprises the step 122, the step 124, the step 126, the step 132 and a step (or block) 142.

As with the method 120, the first several steps 122-126 of the method 140 may black level correct, white balance and demosaic the images captured by the circuit 102. In the step 142, the circuit 104 may perform a lookup table-based conversion of the images. The conversion generally maps the images from a linear RGB color space to a tone corrected YUV color space. Therefore, the step 130 of the method 120 may be eliminated from the method 140. The YUV color space images are generally compressed by the circuit 104 to generate the signal OUT in the step 132.

Figure 5:
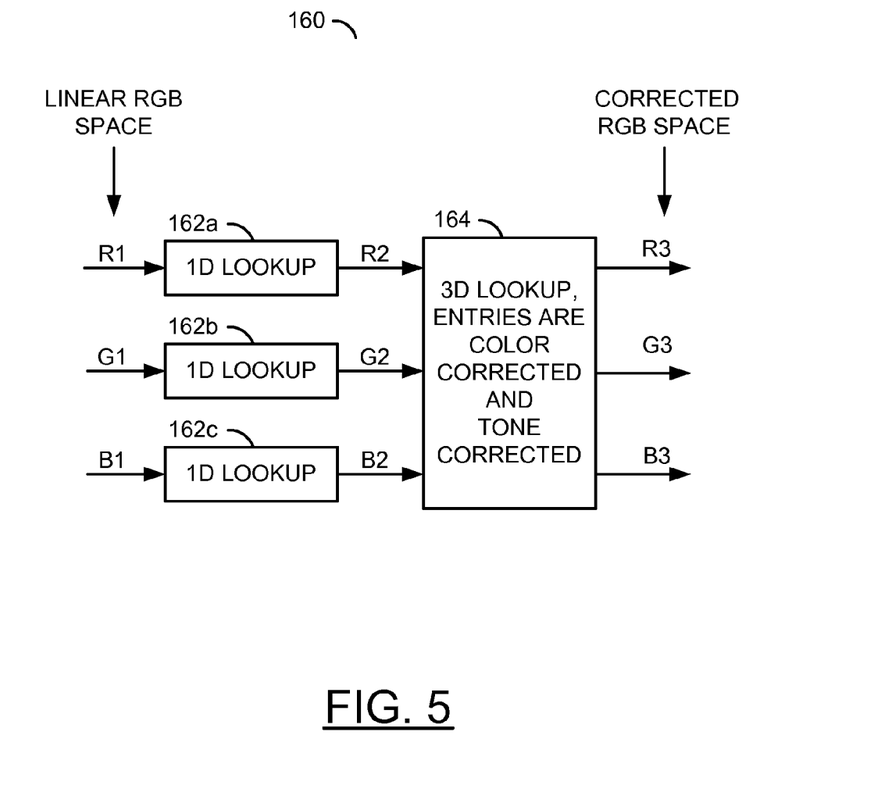
FIG. 5 is a block diagram of a first example implementation of a lookup circuit.

Referring to FIG. 5, a block diagram of a first example implementation of a lookup circuit 160 is shown. The circuit (or module) 160 may be created as part of the circuit 104 and may implement the step 128. The circuit 160 generally comprises multiple circuits (or module) 162a-162c and a circuit (or module) 164. The circuits 162a-164 may be implemented in hardware, software, firmware or any combination thereof.

The circuit 162a may receive an individual color component (e.g., red) of the images in a signal (e.g., R1). A signal (e.g., R2) may carry a converted version of the color component from the circuit 162a to the circuit 164. The circuit 164 may generate and present another converted version of the color component in a signal (e.g., R3). Another color component (e.g., green) of the images may be received by the circuit 162b in a signal (e.g., G1). The circuit 162b may generate a converted version of the color component to the circuit 164 in a signal (e.g., G2). A signal (e.g., G3) may be generated by the circuit 164 conveying another converted version of the color component. Yet another color component (e.g., blue) of the images may be received by the circuit 162c in a signal (e.g., B1). The circuit 162c may generate and present a converted version of the color component in a signal (e.g., B2) to the circuit 164. The circuit 164 may generate and present still another converted version of the color component in a signal (e.g., B3).

Figure 6:
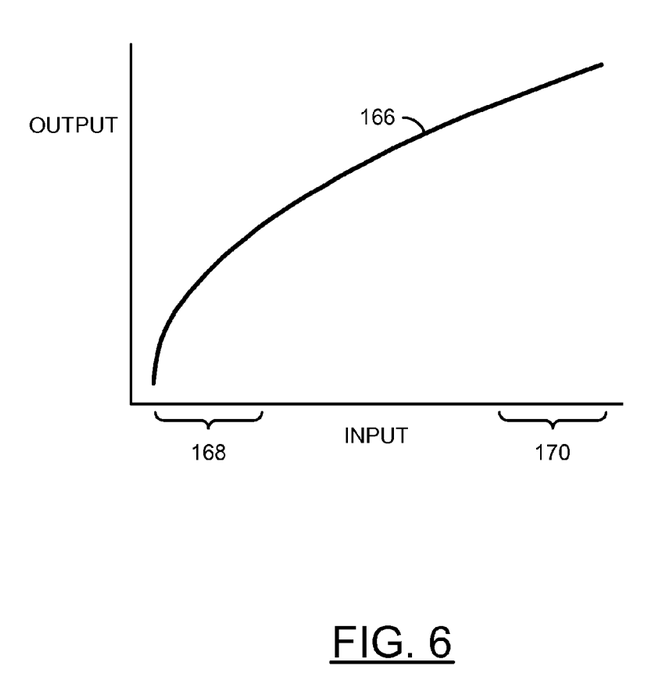
FIG. 6 is a block diagram of an example one-dimensional nonlinear transfer function.

Each of the circuits 162a-162c generally implements a one-dimensional lookup table. Each of the circuits 162a-162c may be operational to map the corresponding input color components of the images from a linear RGB space to a nonlinear RGB space. The mapping may be implemented such that an effective separation between individual values of the color components vary from a dark side (e.g., bottom) to a bright side (e.g., top) of the range of possible values. For example, as illustrated in FIG. 6, a transfer curve 166 stored in the circuits 162a-162c may be more steeply spaced at the bottom side of the range (e.g., region 168) compared with the top side of the range (e.g., region 170). Therefore, relatively small changes in dark input signals R1, G1 and B1 may be expanded in the output signals R2, G2 and B2 to cover more entries in the circuit 164. As such, dark colors may receive more accurate color correction at the expense of bright colors, which may get less accurate color correction. In some embodiments, all of the circuits 162a-162c may store the same transfer curve 166. In other embodiments, each of the circuits 162a-162c may store a different version of the transfer curve 166.

The circuit 164 may implement a multidimensional (e.g., three-dimensional) lookup table. The circuit 164 may be operational to convert the images from the color space established by the signals R2, G2 and B2 into a color corrected and tone corrected color space in the signals R3, G3 and B3.

A combination of the circuits 162a-162c and the circuit 164 may convert the images from the linear RGB space as received from the step 126 into a color corrected and tone corrected RGB color space presented to the step 130. In some embodiments, the circuits 162a-162c may be eliminated and the signals R1, G1 and B1 may be received directly by the circuit 164.

Figure 7:
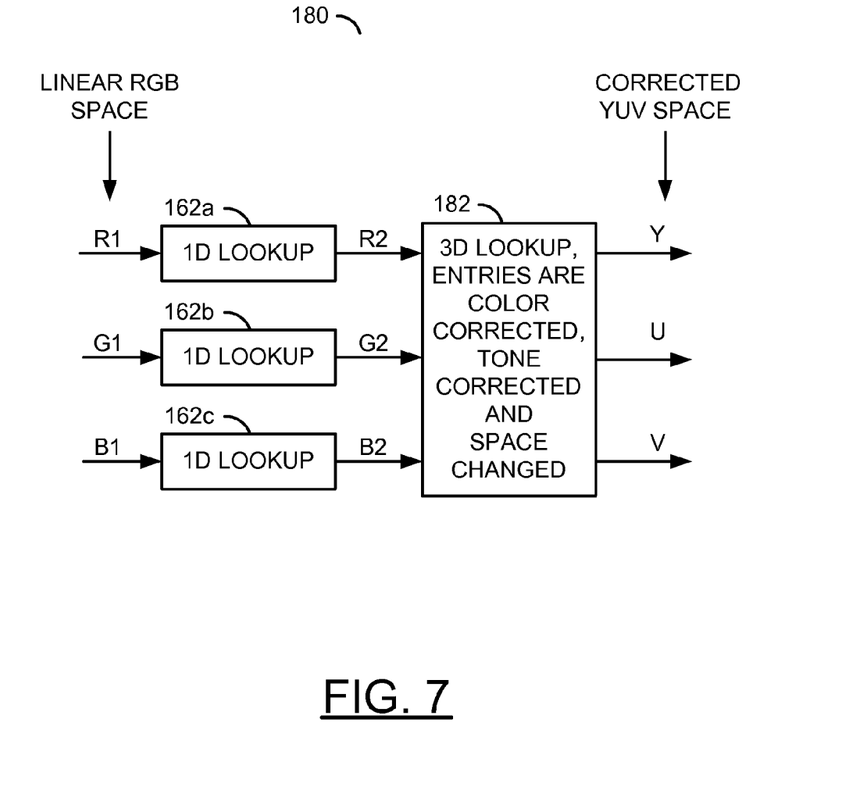
FIG. 7 is a block diagram of a second example implementation of a lookup circuit.

Referring to FIG. 7, a block diagram of a second example implementation of a lookup circuit 180 is shown. The circuit (or module) 180 may be created as part of the circuit 104 and may implement the step 142. The circuit 180 generally comprises the multiple circuits 162a-162c and a circuit (or module) 182. The circuit 182 may be implemented in hardware, software, firmware or any combination thereof.

The color components of the images may be received by the circuits 162a-162c in the respective signals R1, G1 and B1. The circuits 162a-162c may generate the respective signals R2, G2 and B2, which are received by the circuit 182. The circuit 182 may convert the color components established by the signals R2, G2 and B2 into another color space as represented by a luminance signal (e.g., Y) and two chrominance signals (e.g., U and V).

The circuit 182 may implement a multidimensional (e.g., three-dimensional) lookup table. The circuit 182 may be operational to convert the images from the color space established by the signals R2, G2 and B2 into a color corrected and tone corrected different color space (e.g., a YUV color, space) in the signals Y, U and V. A combination of the circuits 162a-162c and the circuit 182 may convert the images from the linear RGB space as received from the step 126 into a color corrected and tone corrected YUV color space presented to the step 132. In some embodiments, the circuits 162a-162c may be eliminated and the signals R1, G1 and B1 may be received directly by the circuit 182.

In some embodiments, the three-dimensional tables of circuits 164 and/or 182 may not cover every possible combination of input values. The lookup tables of the circuits 164 and/or 182 may have a coarse spacing between entries to achieve a reduced size and/or power. Even with the coarse spacing, the number of entries may be large due to the three-dimensional nature of the lookups. For example, if a three-dimensional lookup is 33×33×33, then 35937 entries may be calculated and stored. If a lookup is 16×16×16, then 4096 entries may be calculated and stored. Therefore, the circuits 164 and/or 182 may include an interpolation operation between the table entries. In some embodiments, tri-linear interpolation may be used to estimate between the table entries. In some embodiments, a tetrahedral interpolation may be used, as described in U.S. Pat. No. 4,275,413, which is hereby incorporated by reference in its entirety. Other interpolation methods may be implemented to meet the criteria of a particular application. A combination of the lookup and interpolation may approximate a true three-dimensional transformation, with the approximation being more accurate as the number of entries increases. Based on the type of color correction done, finer spacing for more accurate color correction may be used in some colors more than in other colors.

Figure 8:
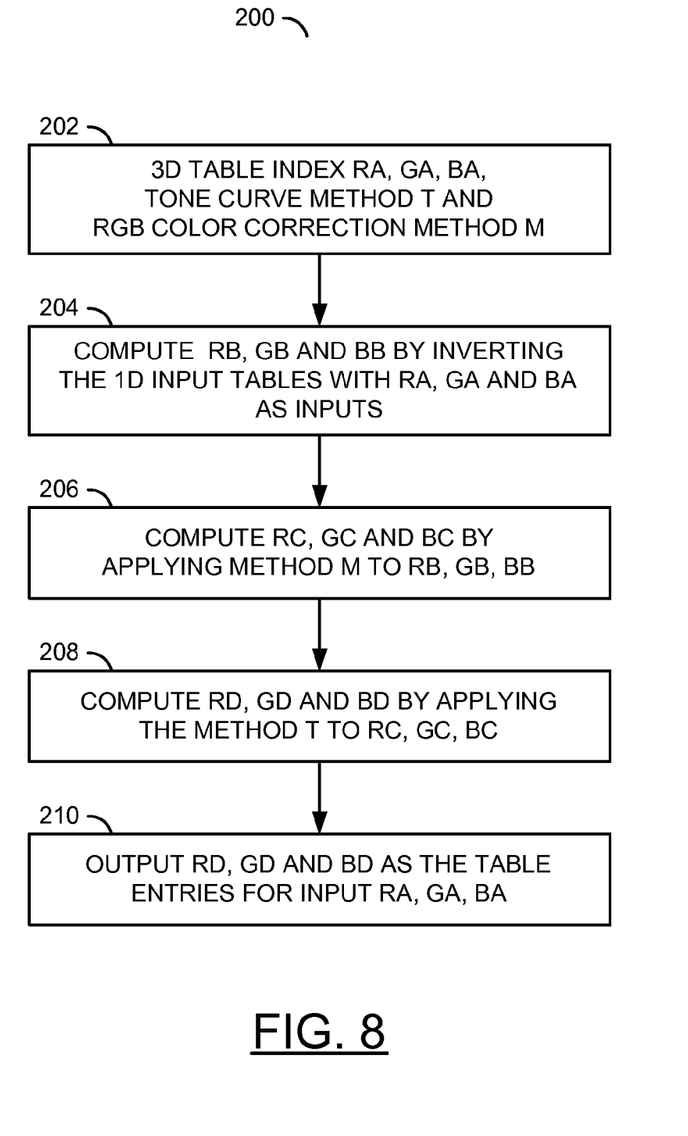
FIG. 8 is a flow diagram of a first example method for programming a three-dimensional table for color correction.

Referring to FIG. 8, a flow diagram of a first example method 200 for programming a three-dimensional table for color correction is shown. The method (or process) 200 may be implemented by a computer external to the apparatus 100. The entries calculated by the method 200 may be loaded into the circuit 164 to achieve the step 128. The method 200 generally comprises a step (or block) 202, a step (or block) 204, a step (or block) 206, a step (or block) 208 and a step (or block) 210.

In the step 202, criteria of the circuit 164 may be determined. The criteria generally includes, but is not limited to, (i) a range of table index values (e.g., RA, GA and BA) for the signals R2, G2 and B2, (ii) a tone curve (correction) method (e.g., T) to be implemented and (iii) a color correction method (e.g., M) to be implemented. The method T may be any standard or proprietary tone correction method. The method M may be any standard or proprietary RGB color correction method. The method 200 is generally applied for each entry in the circuit 164.

For example, if the circuit 164 implements a 16×16×16 table, the method 200 may be applied for each of RA, GA and BA=[0, 1, . . . , 15] for a total of 16×16×16=4096 combinations of RA, GA and BA. In some embodiments, the circuit 160 may use 14 bits for each of the signals R1, G1, B1, R2, G2 and B2, so that each may be represented as an integer in a range [0,16383] and 10 bits for each of the signals R3, G3 and B3, so that each may be represented as an integer in a range [0,1023]. In the step 204, the values RB, GB and BB are generally computed as the input to the lookup table (e.g., R1, G1, B1 into the circuit 160) that may correspond to the exact grid point RA, GA, BA. For example, RA, GA, BA=[1, 3, 5] may correspond to R2, G2, B2=1×16383/15, 3×16383/15, 5×16383/15=[1092, 3277, 5461]. If the circuits 162a-162c implement identity tables, the step 204 may leave the values 1092, 3277, 5461 unchanged (e.g., inverse of identity=identity) so that RB, GB, BB may also have the values 1092, 3277, 5461. On the other hand, if the circuits 162a-162c implement nonlinear tables, like the curve 166 with a steep slope at the bottom and a flatter slope at the top, the step 204 may apply the inverse of such curves (steep slope at the top and a flatter slope at the bottom) to the values 1092, 3277, 5461 and compute, for example, values of 200, 1500, 5000.

The method M may be applied to the representative values RB, GB and BB in the step 206 to establish a matrix of intermediate values (e.g., RC, GC and BC). In the step 208, the method T may be applied to the intermediate values RC, GC and BC to calculate a matrix of final values (e.g., RD, GD and BD). The final values RD, GD and BD may be loaded into to the circuit 164 in the step 210.

Figure 9:
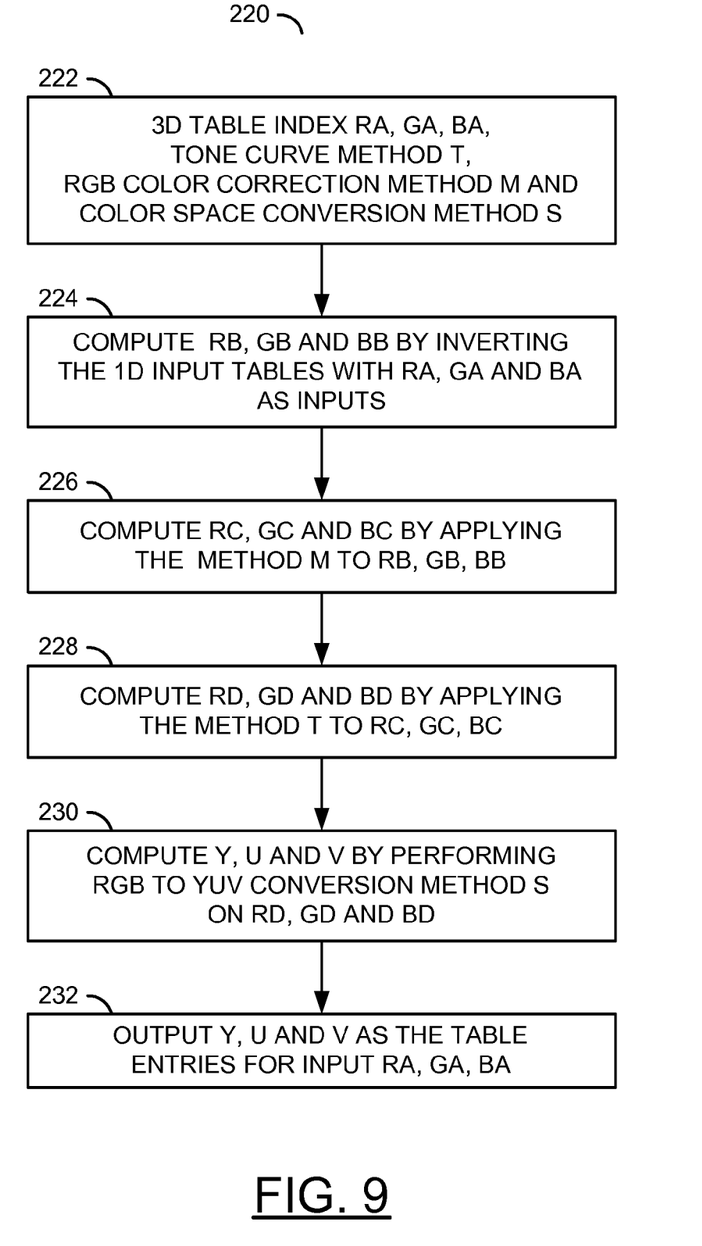
FIG. 9 is a flow diagram of a second example method for programming a three-dimensional table for color correction.

Referring to FIG. 9, a flow diagram of a second example method 220 for programming a three-dimensional table for color correction is shown. The method (or process) 220 may be implemented by a computer external to the apparatus 100. The entries calculated by the method 220 may be loaded into the circuit 182 to achieve the step 142. The method 220 generally comprises a step (or block) 222, a step (or block) 224, a step (or block) 226, a step (or block) 228, a step (or block) 230 and a step (or block) 232.

In the step 222, criteria of the circuit 182 may be determined. The criteria generally includes, but is not limited to, (i) a range of table index values (e.g., RA, GA and BA) for the signals R2, G2 and B2, (ii) a tone curve (correction) method (e.g., T) to be implemented, (iii) a color correction method (e.g., M) to be implemented and (iv) a color space conversion method (e.g., S). The method T may be any standard or proprietary tone correction method. The method M may be any standard or proprietary RGB color correction method. The method S may be any standard or proprietary RGB to YUV color space conversion method. The method 220 is generally applied for each entry in the circuit 182.

For example, if the circuit 182 implements a 32×32×32 table, the method 220 may be applied for each RA, GA and BA=[0, 1, ... , 31] for a total of 32×32×32=32768 combinations of RA, GA and BA. In some embodiments, the circuit 180 may use 14 bits for each of the signals R1, G1, B1, R2, G2 and B2, so that each may be represented as an integer in a range [0,16383] and 10 bits for each of the signals R3, G3 and B3, so that each may be represented as an integer in a range [0,1023]. In the step 224, the values RB, GB and BB are generally computed as the input to the lookup table (e.g., R1, G1, B1 into the circuit 180) that may correspond to the exact grid point RA, GA, BA. For example, RA, GA, BA=[1, 3, 5] may correspond to R2, G2, B2=1×16383/31, 3×16383/31, 5×16383/31=[528, 1585, 2642]. If the circuits 162a-162c implement identity tables, the step 224 may leave the values 528, 1585, 2642 unchanged (e.g., inverse of identity=identity) so that RB, GB, BB may also have the values 528, 1585, 2642. On the other hand, if the circuits 162a-162c implement nonlinear tables, like the curve 166 with a steep slope at the bottom and a flatter slope at the top, the step 224 may apply the inverse of such curves (steep slope at the top and a flatter slope at the bottom) to the values 526, 1585, 2642 and compute, for example, values of 96, 727, 2424.

The method M may be applied to the representative values RB, GB and BB in the step 226 to establish a matrix of intermediate values (e.g., RC, GC and BC). In the step 228, the method T may be applied to the intermediate values RC, GC and BC to calculate a matrix of color corrected values (e.g., RD, GD and BD). In the step 230, the method S may be applied to the color corrected values RD, GD and BD to calculate final values (e.g., Y, U and V) in the YUV color space. The final values Y, U and V may be loaded into to the circuit 182 in the step 232.

While the programming of the lookup tables of the circuits 164 and 182 may be more complex than the programming of ordinary lookup tables, the lookup table programming is generally done once per table entry, whereas the saved computations (no tone correction and/or no conversion from RGB to YUV) may be saved for each pixel in an image or, if multiple images are processed for given table programming, each pixel in the images.

The functions performed by the diagrams of FIGS. 2-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a plurality of first lookup tables (i) configured to generate a plurality of second signals and (ii) indexed respectively by a plurality of first signals carrying a digital image; and
a second lookup table (i) configured to generate a plurality of third signals, (ii) indexed by said second signals and (iii) having a plurality of entries, wherein (a) a first group of colors has a wider spacing of said entries than a second group of colors, (b) said entries are calculated to combine at least two sequential color adjustment steps into a single adjustment step of said digital image and (c) said apparatus is configured to change said digital image from an original color space to a different color space.

2. The apparatus according to claim 1, wherein said apparatus forms part of a camera.

3. The apparatus according to claim 1, wherein said entries are calculated to change said digital image from said original color space in said second signals to said different color space in said third signals.

4. The apparatus according to claim 3, wherein said digital image is in an RGB color space in said second signals and a YUV color space in said third signals.

5. The apparatus according to claim 1, wherein said entries are calculated to perform a color correction.

6. The apparatus according to claim 1, wherein said entries are calculated to perform a tone correction.

7. The apparatus according to claim 1, wherein said entries are calculated to perform both a color correction and a tone correction.

8. The apparatus according to claim 1, wherein said entries are calculated to perform all of a color correction, a tone correction and a color space conversion.

9. The apparatus according to claim 1, wherein said at least two sequential color adjustment steps are performed per each index value.

10. A method for combined color processing, comprising the steps of:
(A) generating a plurality of second signals using a plurality of first lookup tables indexed respectively by a plurality of first signals carrying a digital image;
(B) generating a plurality of third signals using a second lookup table indexed by said second signals, wherein (i) said second lookup table has a plurality of entries, (ii) a first group of colors has a wider spacing of said entries than a second group of colors and (iii) said entries are calculated to combine at least two sequential color adjustment steps into a single adjustment step of said digital image; and
(C) changing said digital image from an original color space to a different color space.

11. The method according to claim 10, wherein said method is implemented in a camera.

12. The method according to claim 10, wherein said entries are calculated to change said digital image from said original color space in said second signals to said different color space in said third signals.

13. The method according to claim 12, wherein said digital image is in an RGB color space in said second signals and a YUV color space in said third signals.

14. The method according to claim 10, wherein said entries are calculated to perform a color correction.

15. The method according to claim 10, wherein said entries are calculated to perform a tone correction.

16. The method according to claim 10, wherein said entries are calculated to perform both a color correction and a tone correction.

17. The method according to claim 10, wherein said entries are calculated to perform all of a color correction, a tone correction and a color space conversion.

18. The method according to claim 10, wherein said at least two sequential color adjustment steps are performed per each index value.

19. An apparatus comprising:
means for generating a plurality of second signals using, a plurality of first lookup tables indexed respectively by a plurality of first signals carrying a digital image;
means for generating a plurality of third signals using a second lookup table indexed by said second signals, wherein (i) said second lookup table has a plurality of entries, (ii) a first group of colors has a wider spacing of said entries than a second group of colors and (iii) said entries are calculated to combine at least two sequential color adjustment steps into a single adjustment step of said digital image; and
means for changing said digital image from an original color space to a different color space.

* * * * *